United States Patent
Senn (10) Patent No.: US 11,551,094 B2
(45) Date of Patent: Jan. 10, 2023

(54) SYSTEM AND METHOD FOR DEEP NEURAL NETWORK COMPRESSION

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventor: Melanie Senn, Mountain View, CA (US)

(73) Assignees: VOLKSWAGEN AKTIENGESELLSCHAFT, Wolfsburg (DE); AUDI AG, Ingolstadt (DE); DR ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 910 days.

(21) Appl. No.: 16/413,203

(22) Filed: May 15, 2019

(65) Prior Publication Data
US 2020/0364572 A1    Nov. 19, 2020

(51) Int. Cl.
G06N 3/08 (2006.01)
H04W 4/40 (2018.01)
G06K 9/62 (2022.01)

(52) U.S. Cl.
CPC .......... G06N 3/082 (2013.01); G06K 9/6215 (2013.01); G06K 9/6218 (2013.01); H04W 4/40 (2018.02)

(58) Field of Classification Search
CPC .......... G06N 3/02; G06N 20/00; G06N 3/082; G06K 9/6215; G06K 9/6218
See application file for complete search history.

(56) References Cited

U.S. PATENT DOCUMENTS

| | | | |
|---|---|---|---|
| 2018/0181857 A1 | 6/2018 | Mathew et al. | |
| 2018/0336425 A1* | 11/2018 | Kadav | G06V 30/194 |
| 2019/0050727 A1 | 2/2019 | Anderson et al. | |
| 2019/0087729 A1 | 3/2019 | Byun et al. | |
| 2020/0342315 A1* | 10/2020 | Achterhold | G06N 3/08 |

OTHER PUBLICATIONS

Li et al. "Filter Level Pruning Based on Similar Feature Extraction for Convolutional Neural Network", IEICE, Jan. 1, 2018 (Year: 2018).*
Zhang et al. "OpenVDAP: An Open Vehicular Data Analytics Platform for CAVs", IEEE Jul. 2, 2018 (Year: 2018).*
Tao Ma et al., A Hybrid Spectral Clustering and Deep Neural Network Ensemble Algorithm for Intrusion Detection in Sensor Networks, Sensors 2016, MDPI, Oct. 13, 2016.
Lucas Theis et al., Faster Gaze Prediction With Dense Networks and Fisher Pruning, Jul. 9, 2018.
Vivienne Sze et al., Efficient Processing of Deep Neural Networks: A Tutorial and Survey, Aug. 13, 2017.
Pavlo Molchanov, Pruning Convolutional Neural Networks for Resource Efficient Inference, ICLR 2017, Jun. 8, 2017.

* cited by examiner

*Primary Examiner* — Benyam Haile
(74) *Attorney, Agent, or Firm* — Wong & Rees LLP; Zhi Chong Gu (57) ABSTRACT

A system and a method are provided for compressing a deep neural network ("DNN"). In some examples, the DNN is trained, where the DNN has at least one layer having multiple filters. Clustering of the filters of at least one layer is performed. Dimension reduction can be applied as well to the filters to reduce the channel dimensionality of the at least one layer. The dimensionally reduced DNN can then be retrained. Once retrained, the compressed DNN can be stored in a storage device.

20 Claims, 8 Drawing Sheets

SYSTEM AND METHOD FOR DEEP NEURAL NETWORK COMPRESSION

CROSS-REFERENCE TO RELATED APPLICATIONS

None.

FIELD

The present disclosure relates to methods, apparatuses, and systems for a deep neural network and, more particularly, to compressing the deep neural network.

BACKGROUND

Deep neural networks ("DNNs") are widely used for many artificial intelligence ("AI") applications including computer vision, autonomous vehicles, speech recognition, language translations, advertising, cancer detection, and robotics. While DNNs deliver state-of-the-art accuracy for many tasks, DNNs require a high amount of computational processing power and a high amount of data storage to perform those tasks. Particularly, in mobile applications (e.g., for mobile phones, tablets, and vehicles), transmitting DNN model updates over the air via a wireless broadband communication (e.g., LTE) can be challenging due to limited bandwidth and costs associated with such wireless broadband communication. Thus, for computing devices, such as mobile phones, laptops, internet of things ("IOTs"), in-vehicle computing systems, etc., the processing requirements and storage requirements of a DNN are limiting factors as to whether such computing device can locally process such DNN. Furthermore, if there are multiple DNNs running simultaneously on the computing system, it becomes even more imperative to manage the storage size and complexity of the DNNs. Therefore, it is important to develop techniques that enable compression of DNNs to improve processing efficiency, reduce data storage without sacrificing application accuracy or increasing hardware cost, and/or reduce transmission size of the DNN or updates thereof.

DETAILED DESCRIPTION OF THE EMBODIMENTS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill in the art may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Neural networks are machine-learning models that employ one or more layers of neurons (also referred to as "nodes") to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Figure 1:
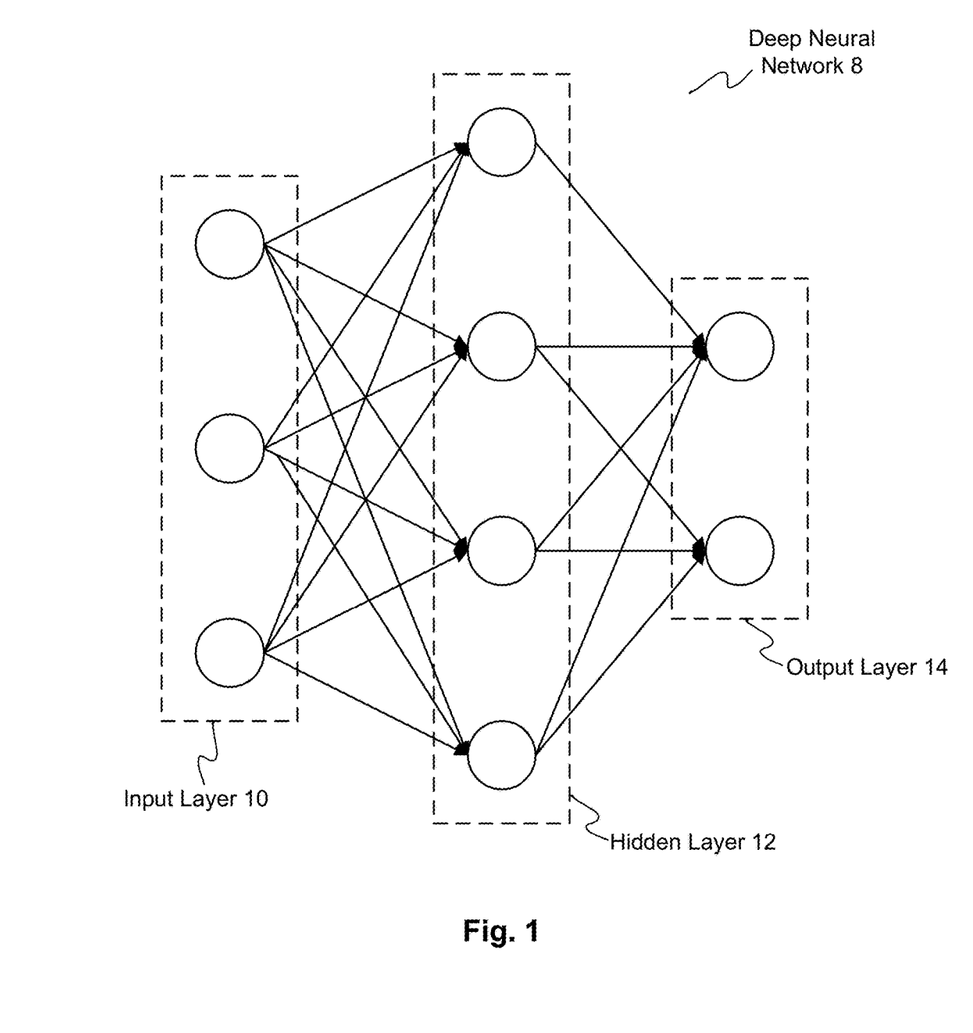
FIG. 1 illustrates a simplified example of a deep neural network having a hidden layer.

FIG. 1 illustrates a simplified example of a deep neural network ("DNN") having a single hidden layer. In an example of a DNN, a neural network 8 comprises an input layer 10, a hidden layer 12, and an output layer 14. The input layer 10 has three nodes; the hidden layer 12 has four nodes; and the output layer 14 has two nodes. It can be appreciated that there can be any number of hidden layers in the DNN. The hidden layer 12 is merely for illustration and is not meant to limit the present disclosure to a single hidden layer. The number of hidden layers can be predefined by a designer of the DNN and/or can take into account the complexity of the application the DNN will be used for, the accuracy needed for that use, and/or computing system requirements to operate such DNN. Furthermore, it can be appreciated that the number of nodes for each layer can vary as well depending on the application.

At each of the nodes for the layers 10-14, one or more mathematical operations can be performed on the inputted data. The outputs of the input layer 10 are used as inputs for the hidden layer 12, where each node of the input layer 10 is connected to each node of the hidden layer 12. The outputs of the hidden layer 12 are used as inputs for the output layer 14, where each node of the hidden layer 12 is connected to each node of the output layer 14. Thus, the DNN 8 is a feed-forward fully-connected DNN since each node of one layer is connected to all the nodes of the next layer. If this was not the case, the DNN would be characterized as a semi-connected DNN. It can be appreciated that circular self-connections within the same layer are possible as well. Such neural networks are commonly referred to as recurrent neural networks.

Some neural networks termed convolutional neural networks ("CNNs") include one or more convolutional layers. Each convolutional layer has an associated set of filters (also referred to as kernels). Each filter includes values established by a neural network model (e.g., a filter can be represented by an N×M matrix, which has N*M number of values) initialized by a user and/or trained from data. In some implementations, filters can identify particular image contours, shapes, and/or colors. As discussed, each filter can be represented by a matrix structure having weight inputs, and a stack of filters can be represented by a 3D tensor. Generally, a tensor can have an arbitrary number of dimensions compared to a matrix. Specifically, a matrix has 2D dimensions (i.e., rows and columns) and, thus, can be referred to as a 2D tensor. A stack of filters can be referred to as a 3D tensor, where the number of dimensions is fixed and the height, width and number of channels of the 3D tensor may vary. Each convolutional layer can also process a set of inputs from the previous convolutional layer. The transformation result (i.e., output) of a convolutional layer is termed an activation map; the set of activation maps can also be represented as a matrix structure.

A computing system can perform the computations for a given convolutional layer by following instructions from a computer software. For example, the computing system follows the software instructions to apply each filter of the corresponding layer to the set of inputs or activation map(s) of the previous convolutional layer. That is, for each filter, the computing system can overlay the corresponding filter (typically represented multi-dimensionally) over a first portion of inputs, which can also be represented multi-dimensionally. The computing system can then compute a dot product from the overlapped elements. The dot product can correspond to a single input, e.g., an input element that has an upper-left position in the overlapped multi-dimensional space. Using a sliding window, the computing system can shift the filter to overlay a second portion of activation inputs and calculate another dot product corresponding to another input. The computer software can repeatedly perform this process until each input has a corresponding dot product. In some embodiments, the dot products are input to an activation function, which generates activation values. The activation values can be combined, e.g., pooled, before being sent to a subsequent layer of the neural network.

As mentioned, a way of computing convolution calculations requires numerous matrix multiplications in a large dimensional space. A processor, e.g., a graphical processing unit ("GPU"), can optimize the computation of matrix multiplications. Although compute-intensive and time-intensive, the processor can repeatedly calculate individual sums and products for convolution calculations. The degree to which the processor parallelizes calculations is limited due to its architecture. As the number of filters increase in each convolutional layer, more convolution calculations are necessary, which consume a large amount of computing power. Additionally, a large amount of data storage is needed to store the DNN.

DNN compression can be used to speed up a DNN's execution at runtime (e.g., during inference) and reduce the DNN's size in memory. Compression can be achieved by pruning, i.e., removing weight connections between layers. There are pruning methods that are independent from the training data and remove weight values directly by their importance, or replace layer weights by transformed lower dimensional representations. Other pruning approaches take into account activation maps that are dependent on the loss and thus on the training data. Using a limited data subset for pruning might be correlated with poor generalizability of the DNN with respect to corner cases, i.e., rare new unseen data.

When removing filter redundancy from the network by pruning, close attention needs to be made to make sure that the remaining filters are representative for their layers. Therefore, similarities in recognizing features among filters need to be analyzed rather than the importance of individual filters. An unstructured DNN architecture should be avoided since it is not efficiently supported by deep learning frameworks. Configuration effort should be limited (e.g. specification of parameter thresholds that vary with datasets and are hard to generalize) and explainability of pruning selections is desired. A pruning algorithm needs to be relatively expedient, since it may need to be repeated multiple times and be capable of handling high dimensionality in filter sizes.

Figure 2:
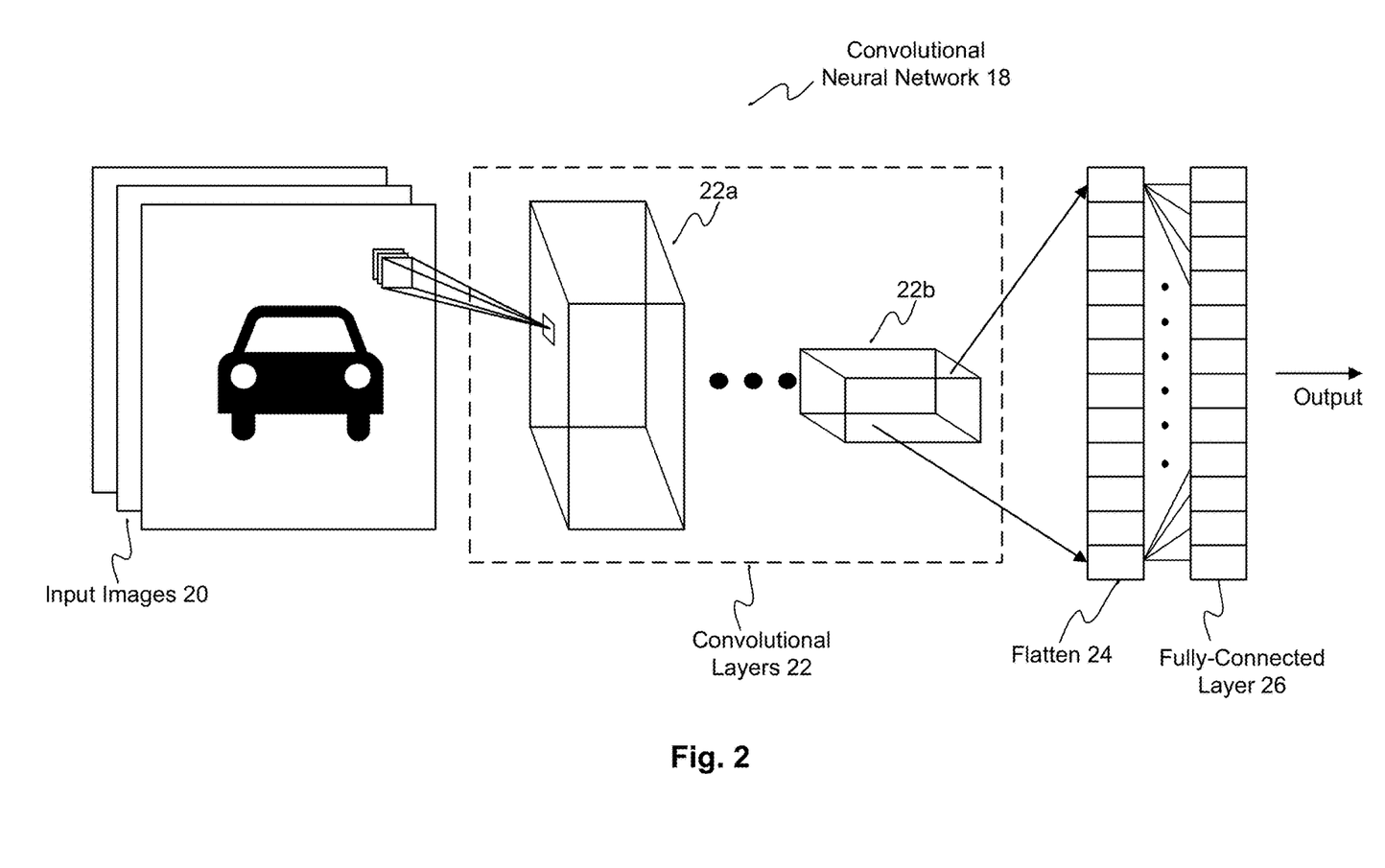
FIG. 2 illustrates a simplified example of a convolutional neural network having a plurality of convolutional layers.

FIG. 2 illustrates a simplified example of a convolutional neural network having a plurality of convolutional layers. In an example of a CNN, a CNN 18 comprises input images 20, convolutional layers 22, a flatten layer 24, and a fully-connected layer 26 for output. The input images 20 comprise three channel dimensions, where one image can correspond to a distinct color spectrum, e.g., red, green, or blue. The input images 20 are inputted to the convolutional layers 22.

Each of the convolutional layers 22 has a plurality of filters (not shown), which are applied to the inputted data to generate one or more activation maps. The generated activation maps(s) are passed on to a next layer of the CNN 18. For instance, a convolutional layer (not shown) can be applied to the input images 20 to generate the activation map 22a. The activation map 22a is used as input to the next convolutional layer (also not shown) to generate a next activation layer. Consequently, an activation map 22b is generated and then flattened in a flatten layer 24. The flatten layer 24 is fully connected with a fully-connected layer 26. The fully-connected layer 26 generates the outputs for the CNN 18.

In application, CNNs are useful in identifying objects since the structure of a CNN lends itself for identifying patterns in two-dimensional ("2-D") space, e.g., in 2-D images. Using the example above, the convolutional layers 22 can generate a stream of activation maps, where the initial maps identify very simple structures such as edges. The later activation maps near the end of this stream can identify more complex structures such as object types. These identified structures can be flattened and connected to the fully-connected layer 26 for output to describe the mapping between features and object types. The output can be a set of values (e.g., between 0 and 1), where each value corresponds to a determined likelihood that an object relates to a particular classification. The individual values for the likelihood of different object types must sum to one (e.g., 0.1 for car, 0.7 for truck, and 0.2 for bus).

Figure 3:
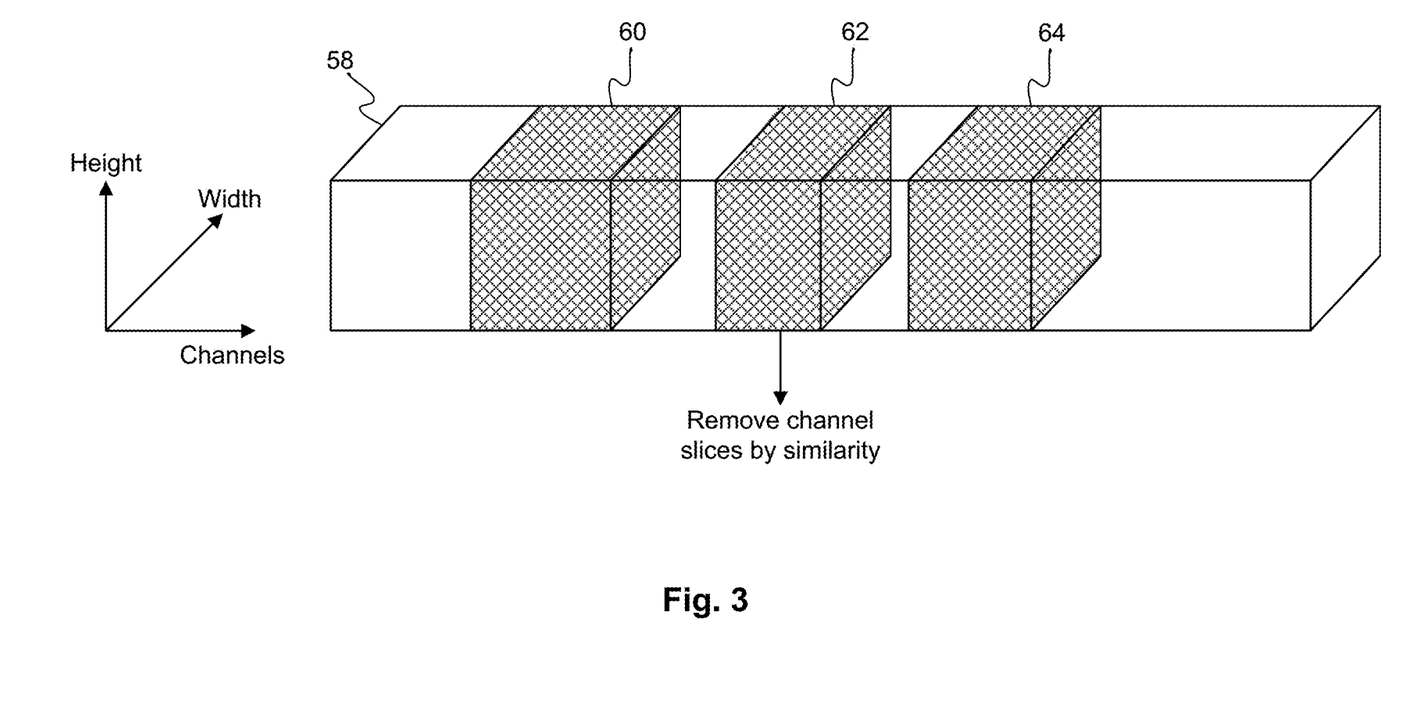
FIG. 3 illustrates a three-dimensional representation of a plurality of filters for a convolutional layer of a CNN.

FIG. 3 illustrates a three-dimensional representation of a plurality of filters for a layer of an example of a CNN. A plurality of filters can be illustrated in a three-dimensional ("3-D") space, where the axes of that 3-D space are height, width, and channel depth. The channel depth relates to the number of filters for a particular layer. For instance, ten channels for a convolutional layer can mean that there are ten filters in that convolutional layer. Referring to FIG. 3, a convolutional layer 58 can have a plurality of filters (e.g., filters 60, 62, and 64). The filters of that layer 58 can be aligned with each other in 3-D space, depicting a rectangular tube.

In at least one embodiment, similarities among filters of a layer are analyzed for compression rather than evaluating the importance of individual filters. Similarities in filters are used to remove one or more filters that are adequately represented by other filters in the convolutional layer 58. This can prevent the removal of information that seems irrelevant for the training data, but might be important for rare new unseen data (i.e., corner cases).

For instance, in an example, the filter 60 can be compared with the filters 62 and 64; and the filter 62 can be further compared to filter 64. The comparison may find that the filters 60 and 62 identify similar objects and thus do not need to be both applied to input data. Thus, the filter 62 can be removed from the convolutional layer 58 since it is adequately represented by the filter 60.

Additionally, it can be determined that the filter 64 is different enough from filter 60 such that the convolutional layer 58 should keep both the filters 60 and 64 to be applied to input data. Similarity and/or non-similarity between filters can be determined by applying subspace clustering as described herein.

In such approach, similarity pruning may not affect generalizability of a neural network. By removing entire channels, unstructured DNN architectures may be avoided. In particular, a subspace clustering approach that consists of iterative runs of dimension reduction and clustering can be performed to keep the DNN architecture structured. While dimension reduction and clustering may yield a lower dimensional representation of characteristic features, both methods can differ in their transformation process. For instance, in dimension reduction, the transformed quantities yield completely new values in a lower dimensional space. Clustering methods identify representative groups in the data and select characteristic representatives.

In at least one embodiment, density-based clustering and dimension reduction are combined in an iterative process to obtain advantages from both methods. For a clustering method, a DBSCAN or OPTICS algorithm can be used in which clusters are defined as areas of higher density compared to the remaining samples of the data set. Objects in sparse areas that are required for separate clusters can be considered noise and/or border points. These clustering methods can be fast to apply and the user may not need to specify the number of clusters (as in k-means), nor specify a linkage criterion (which is typically necessary in hierarchical clustering).

For dimension reduction, a singular value decomposition method or a principal component analysis can be performed to determine linear and/or orthogonal data. Additionally, for convolutional neural networks, auto-encoders for data with stronger non-linearity can be used. These dimension reduction techniques can reduce the curse of dimensionality and therefore increase performance by revealing characteristic and/or orthogonal features that provide insight (e.g., explainability) to a user as opposed to complex representations in higher dimensional spaces.

For a further extension, a self-organizing map and learning vector quantization can be used for subspace clustering. A similarity measure can operate in the weight space directly or calculate correlations between filters using a Pearson correlation coefficient.

In an example embodiment, structured pruning preserves a structure of a DNN by pruning entire channels, instead of individual neurons. Thereby, stability is preserved during pruning since removed filters are adequately represented by other filters to avoid decreased generalizability with respect to unseen data. Furthermore, similarity pruning is fast since calculations are performed in representative, lower dimensional sub spaces. However, there may be an increased effort in retraining the network after such similarity pruning to obtain a certain accuracy for the DNN.

In an example embodiment, evaluation of the original DNN can be performed to generate a baseline. During pruning, channels are removed using a subspace clustering approach. To compensate for the removed information, the DNN may need to be retrained to adjust its weights until a similar accuracy from before pruning is obtained during evaluation of the compressed DNN. This iterative process can continue until a user is satisfied with respect to the DNN compression versus the DNN's accuracy.

Figure 4:
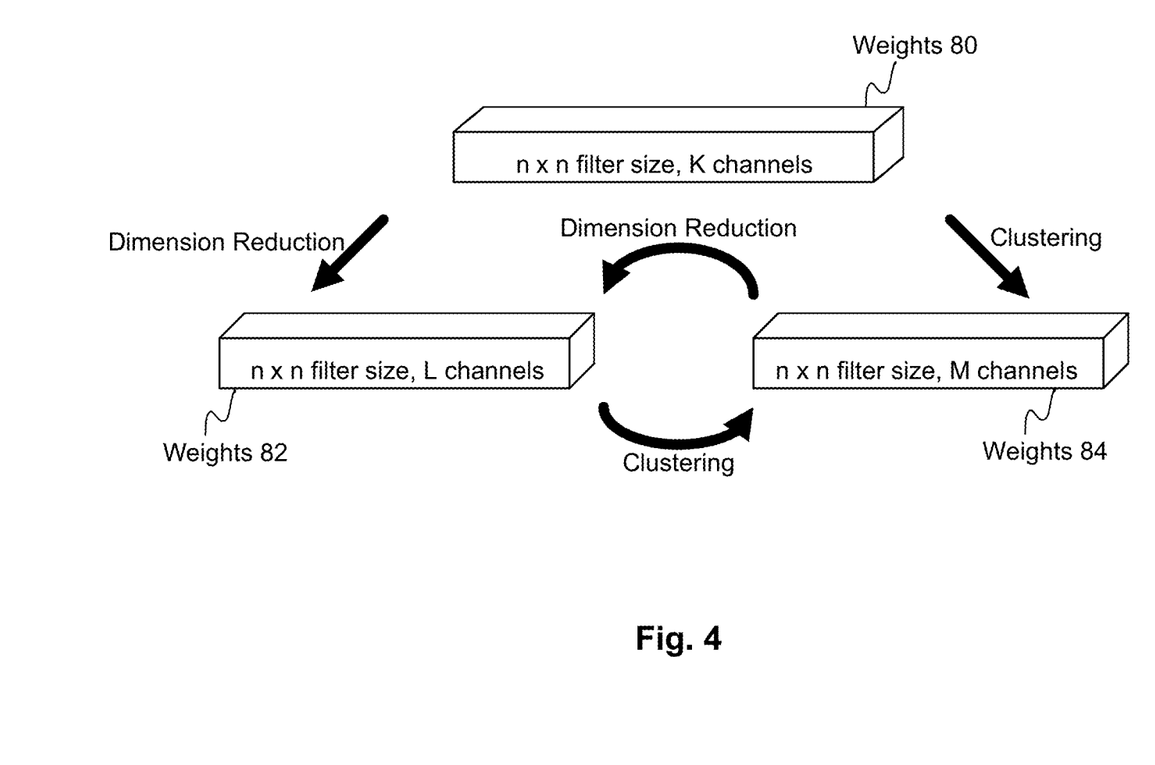
FIG. 4 illustrates a block diagram of an embodiment for filter similarity pruning of the present disclosure.

FIG. 4 illustrates a block diagram for an example embodiment for filter similarity pruning. In at least one embodiment, original weights 80 of the filters for a convolutional layer can have a filter size of n by n with K channels. The number of channels for the filters can be compressed in a weight space such that the overall number of channels for that compressed convolutional layer are reduced.

A dimension reduction algorithm can be applied to the original weights 80 to generate compressed weights 82. The compressed weights 82 have the same filter size of n by n. The number of channels of the original weights 80 can be reduced to L, where L<K. Next, a clustering algorithm can be further applied to the compressed weights 82 to generate weights 84. The clustered weights 84 can have the same filter size of n by n and may have the same channel size of L. However, clustering can be performed such that the number of channels can be further reduced to M, where M<L.

This process can run iteratively by repeating a dimension reduction step after the clustering step. The number of iterations for each step can be selected based on one and/or more of the following: the desired size of the DNN, the application for the corresponding neural network, the amount of retraining necessary, and the accuracy needed for handling such application.

In at least one alternative embodiment, instead of applying a dimension reduction step first, a clustering algorithm can be performed first on the original weights 80. Thus, the clustering algorithm is applied to the original weights 80 to generate compressed weights 84. The compressed weights 84 have the same filter size of n by n. However, the number of channels of the original weights 80 is reduced to M, where M<K. Next, a dimension reduction algorithm can be further applied to the compressed weights 84 to generate weights 82. The dimensionally reduced weights 82 can have the same filter size of n by n. However, dimension reduction can be can be performed such that the number of channels can be further reduced to L, where L<M.

This process can run iteratively by repeating a clustering step after the dimension reduction step. The number of iterations for each step can be selected based on one and/or more of the following: the desired size of the DNN, the application for the corresponding neural network, the amount of retraining necessary, and the accuracy needed for handling such application.

Filter similarity pruning can comprise a combination of applying dimension reduction and then clustering and vice versa. Furthermore, it can be appreciated that included in such method is an iterative process where dimension reduction and clustering can be repeated a plurality of times for a layer having multiple filters.

In yet another example embodiment, a subspace clustering approach can also be applied to automatic labelling for supervised learning tasks. Subspace clustering transforms the original data (i.e., images as features plus their labels) to a lower dimensional space, in which a labeler creates annotations only on the characteristic representatives that can be propagated to the entire data set. This results in reduced labelling effort and makes the labelling task more consistent. Novelty and/or anomaly detection tasks can be solved with this subspace clustering approach as well by identifying novelties and/or anomalies as points out of the cluster boundaries of (sub) clusters of normal data.

Figure 5:
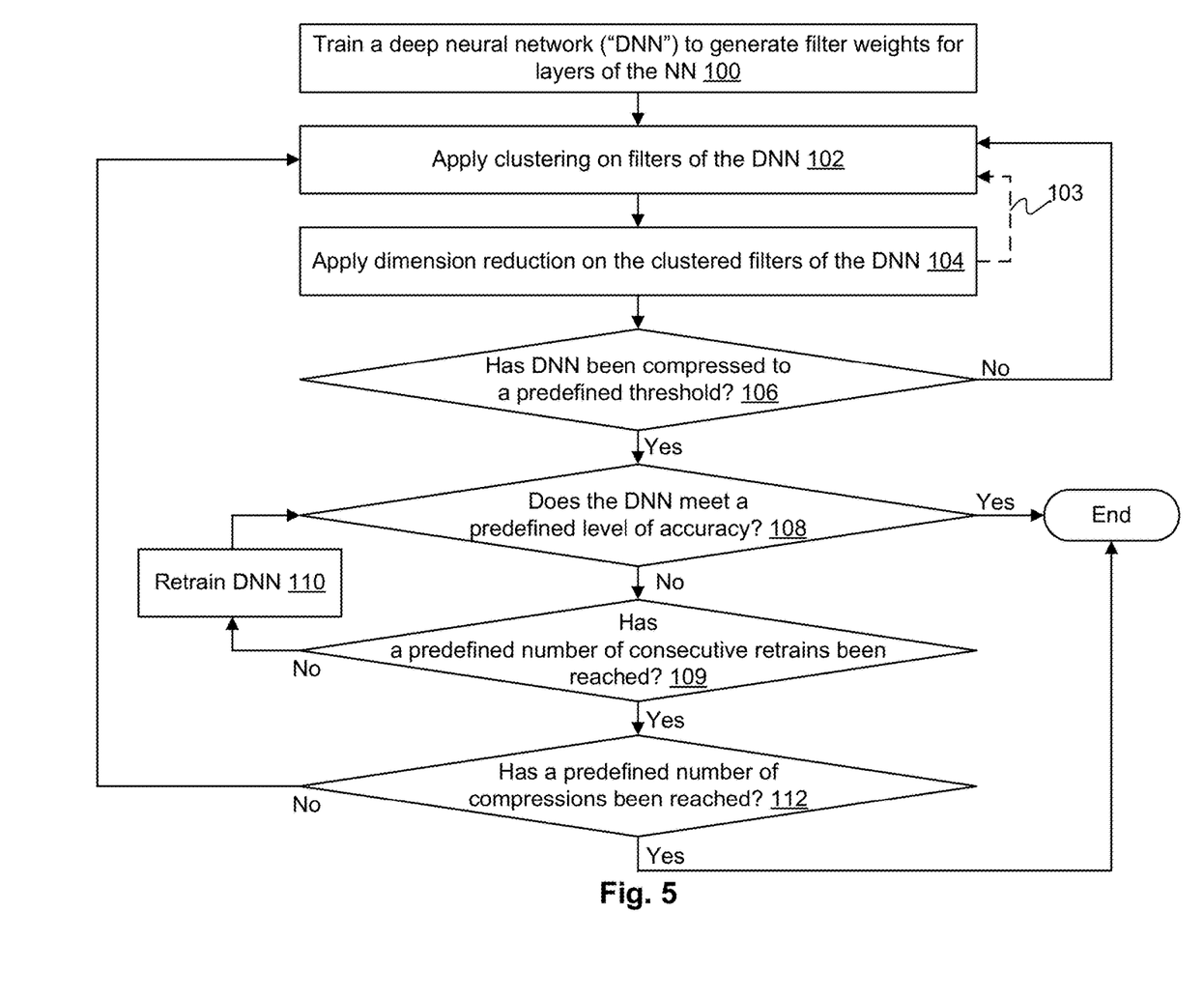
FIG. 5 illustrates a flow chart of another example embodiment for filter similarity pruning of the present disclosure.

FIG. 5 illustrates a flow chart of an embodiment of the present disclosure for filter similarity pruning. In at least one embodiment, a DNN can be trained to generate filter weights for layers of the NN, 100. Next, clustering can be applied on the filters of the DNN 102. Various clustering methods can be used to implement this step including: centroid-based clustering (e.g., k-means clustering), density-based clustering (e.g., DBSCAN and OPTICS), hierarchical clustering, and/or distribution-based clustering (e.g., Gaussian mixture models with expectation-maximization algorithm).

Dimension reduction can then be applied to the clustered filters of the DNN 104. Various dimension reduction methods can be used to implement this step, including: singular value decomposition, principal component analysis ("PCA"), independent component analysis, autoencoder, kernel PCA, isomap, and/or locally-linear embedding. In an embodiment, after applying dimension reduction 104, clustering of the filters of the DNN 102 can be repeated one or more times 103; the number of repetitions can be predefined or otherwise defined by the respective system.

A predefined threshold (e.g., a percentage of the original data storage size of the DNN or a maximum data storage size for the DNN) can be selected to identify when to apply the clustering 102 or when to check the accuracy of the DNN 108. If the predefined threshold is not met 106, then clustering 102 and dimension reduction 104 can be iteratively applied until the DNN is at or below such predefined threshold.

It can be appreciated that a selection can be made to apply compression on a layer type and/or by a layer name. In an embodiment, compression can be applied based on a layer type (e.g., convolutional layer) of a DNN with multiple layer types (e.g., convolutional and fully-connected layers). Thus, compression can be applied to the convolutional layers. In another embodiment, compression can be applied based on a layer name, where each layer can be uniquely identified in a DNN. In an embodiment, the layers can be identified as early convolutional layers or later convolutional layers, and compression may only be applied to early convolutional layers or later convolutional layers. Descriptors such as early convolutional layers and later convolutional layers may be predefined or can be understood based on the particular DNN. It can be appreciated that combinations of using layer types and layer names for compression can also be used in other embodiments.

If the DNN has not been compressed to the predefined threshold 106, clustering 102 is applied again on the DNN to further compress the DNN. This iterative process can continue until the DNN has been compressed to within the predefined threshold.

In an example embodiment, the predefined threshold can be set to 50% of the original DNN data storage size. Clustering can reduce the data storage size of the DNN by 25% of the original data storage size and dimension reduction can reduce the DNN further by another 25% of the original data storage size. The clustering and dimension reduction can be applied such that the compressed DNN has reached 50%.

In another example embodiment, if clustering and dimension reduction each reduce the DNN in increments of 4%, clustering and dimension reduction can be iteratively applied multiple times until the original DNN's data storage size is at or below 50% of its original data storage size.

In an alternative example embodiment, the predefined threshold can be set to a data storage size, e.g., 40 mb. In such example, the original DNN data storage size can be around 200 mb. Clustering can reduce the data storage size of the DNN by 30 mb and dimension reduction can reduce the DNN further by another 20 mb of the original data storage size. The clustering and dimension reduction can be applied iteratively until the compressed DNN has reached the threshold of 40 mb or less.

If the DNN has been compressed to or below the predefined threshold 106, it is determined whether the DNN has met a predefined level of accuracy 108. If so, compression of the DNN is complete. With respect to evaluating whether the DNN has a met the predefined level of accuracy, a preselected data set can be used as input the DNN with expected outcomes. The accuracy can then be calculated based on any variance between the DNN's outputs for that preselected data set and the expected outcomes for the preselected data set.

If the DNN does not meet the predefined level of accuracy, then it is determined whether a predefined number of consecutive retrains have been reached 109. If not, then the DNN is retrained 110 and a counter which stores the number of consecutive retrains can be incremented by one. The counter can be initial set to a default number, e.g., 0, and then incremented by one each time the DNN is retrained 110. Once retrained, the retrained DNN is evaluated 108 to determine if the DNN meets the predefined level of accuracy. This loop continues until either (1) the DNN has met the predefined level of accuracy, in which case compression ends or (2) the counter reaches the predefined number of consecutive retrains 109.

If the counter reaches the predefined number of consecutive retrains 109, then the counter for the number of retrains is reset. Also, it is determined whether a predefined number of compressions have been reached 112. A counter for tracking the number of compressions can be used to track the number of compression loops that are performed. Thus, the counter for tracking the number of compressions can be set to a default number, e.g., 1. When the counter reaches the predefined number of compression, then compression can end to avoid an infinite loop.

If the predefined number of compression has not been reached by the counter 112, then another compression loop is undertaken, starting at 102 and the counter for tracking the number of compressions is incremented, e.g., by 1.

In at least one embodiment, steps 106-112 can be reordered and/or eliminated, such that, after applying dimension reduction 104, retraining of the DNN 110 can be performed next. After retraining, the accuracy can be evaluated 108 to determine if the compressed DNN has met the predefined level of accuracy for a particular data set. Optionally, the compressed DNN can be evaluated 106 to determine if the compressed DNN has been compressed to or below a predefined threshold. If so, then DNN compression is complete. If not, then the previous steps can be performed in another iteration starting at clustering the filters of the DNN 102.

In at least one embodiment, compression of a deep neural network comprises the steps of: training the DNN, wherein the DNN has at least one layer having a number of filters; clustering the filters of the at least one layer to reduce the number of filters of the at least one layer; applying dimension reduction on the clustered filters of the at least one layer; and retraining the DNN.

Referring to FIG. 5, once compression ends, the compressed DNN can be transmitted to a mobile computing device. For instance, the compressed can be transmitted via over-the-air wireless connection to a vehicle, mobile phone, tablet, laptop, and/or other mobile device. Once transmitted to the mobile computing device, the DNN can be used to perform AI related application, e.g., classifying objects, autonomously maneuvering a corresponding vehicle, and/or other application.

Figure 6:
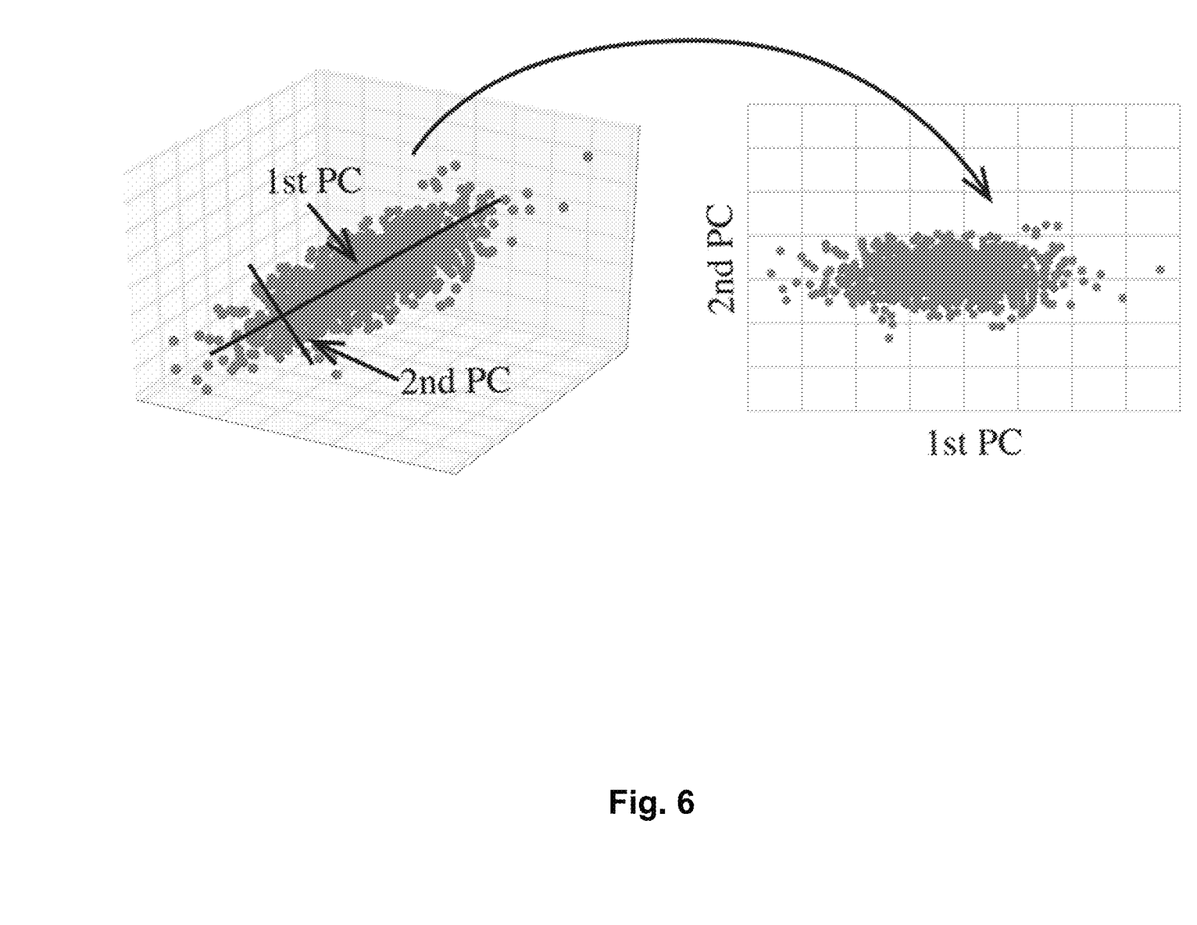
FIG. 6 illustrates an example embodiment for dimension reduction using a principal component analysis ("PCA").

FIG. 6 illustrates an embodiment for dimension reduction using a principal component analysis ("PCA") method. In PCA, new orthogonal dimensions of highest variance in the original data are identified. The new dimensions are sorted by their variance (higher variance is more important) and directions of lower variance (thus less important) can be omitted. A user can select a threshold for desired explained variance criterion between 0 and 100%. The original data can be projected to the new (i.e., reduced) dimensions to obtain data in the reduced space having lower dimensions than the original data.

Figure 7:
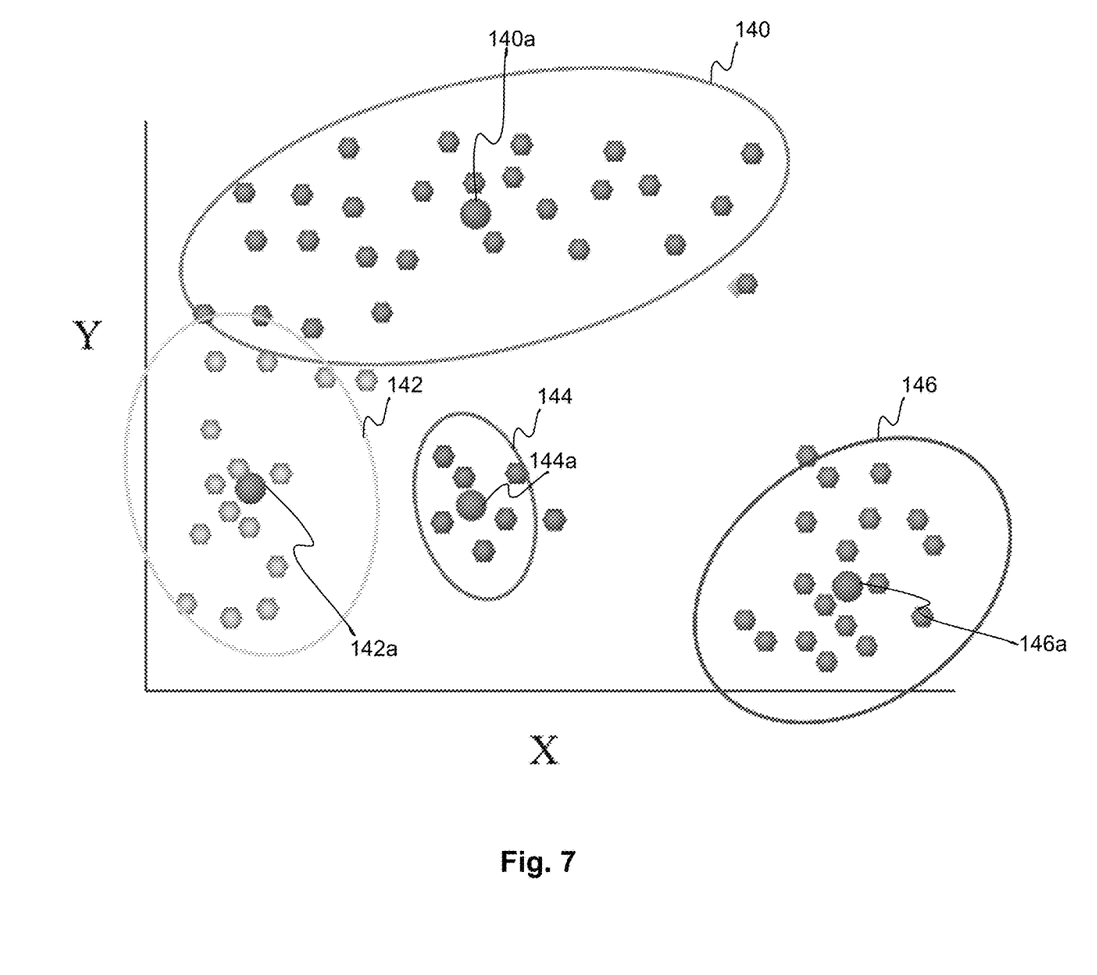
FIG. 7 illustrates a graphical representation for clustering in accordance with at least one embodiment.

FIG. 7 illustrates a graphical representation of a clustering method. In clustering, a group of clusters can be identified. From that group, one or more candidates are used to represent the entire cluster, rather than storing all of the members in the group. In clustering, groups of data points are identified depending on the clustering criterion (e.g., density-based/distribution-based threshold/Euclidean distance in K-means clustering) to separate groups from each other. The goal is to minimize the similarity between clusters and to maximize the similarity within clusters. For a new data point, the corresponding best-matching cluster can be determined (e.g., by Euclidean distance of the new point from the cluster centroids in K-means clustering). Alternatively, a classifier can be trained from the identified groups as labels. Then the corresponding group (or class) can be determined with a classifier. In both dimension reduction/clustering there are two major steps: (1) identify reduced space; and (2) transform data from original to reduced space In an example embodiment, the three-dimensional data set that represents filters can be represented in a two dimensional graph for visualization purposes of dimension reduction and clustering techniques only. However, dimension reduction and clustering methods can be applied to higher dimensional filters such that the effective result is analogous to the mechanisms in dimension reduction/clustering for a data set in two dimensions, except for higher computation time. For this instructive reason, the two dimensional graph is merely used to show the concept behind multidimensional dimension reduction/clustering of filters. Each point in the two dimensional graph can be imagined as a filter which itself is a two-dimensional structure that can be further broken down into a one-dimensional structure.

Clusters 140-146 can be identified using a clustering algorithm. For each of the clusters 140-146, a representative member of that cluster can be used to represent the entire cluster. Thus, only a single filter is needed for any particular cluster. The other filters within that cluster can be deleted, thereby saving additional data storage capacity and computational power having to process the mathematical operations associated with those deleted filters.

In an alternative clustering method, multiple candidates can be used to represent a cluster as so. By having multiple candidates for each cluster, the clusters are better represented and corner cases can be better covered.

Figure 8:
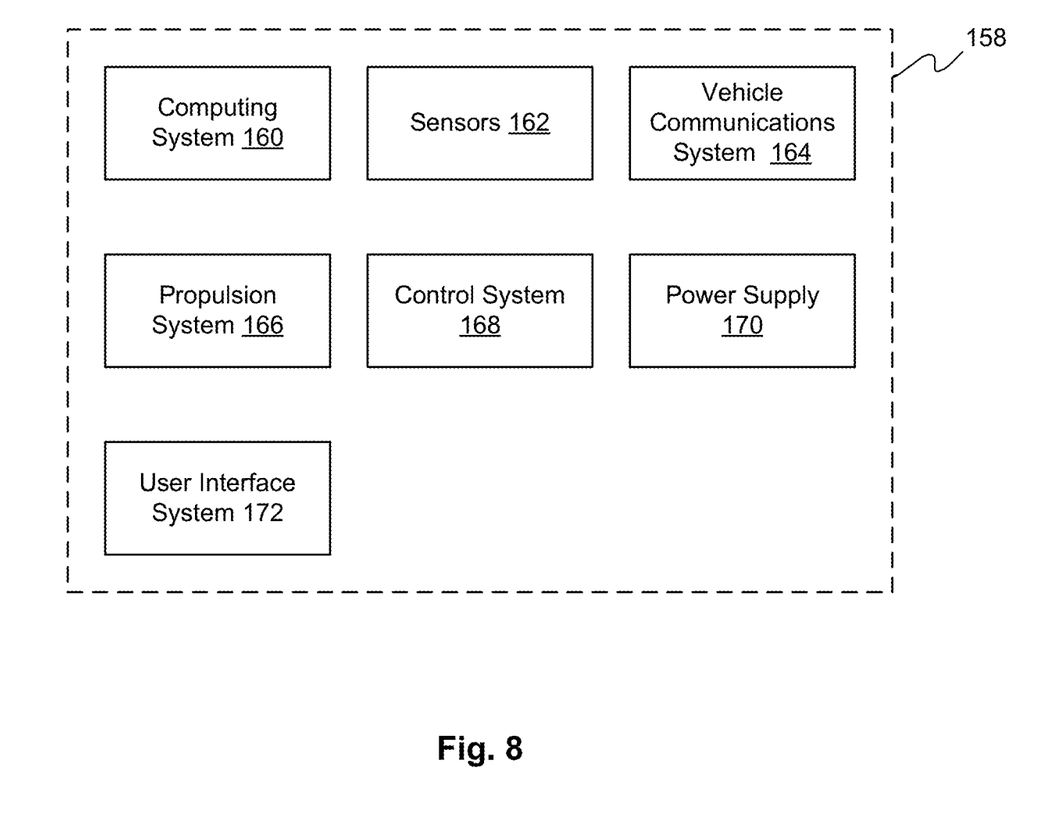
FIG. 8 illustrates a simplified block diagram of a vehicle in accordance with an example embodiment.

FIG. 8 illustrates a simplified block diagram of a vehicle in accordance with an example embodiment. In an example embodiment, a vehicle 158 comprises a computing system 160, sensors 162, a vehicle communications system 164, a propulsion system 166, a control system 168, a power supply 170, and a user interface system 172. In other embodiments, the vehicle 158 may include more, fewer, and/or different systems, and each system may include more, fewer, and/or different components. Additionally, the systems and/or components may be combined and/or divided in a number of arrangements.

The computing system 160 may be configured to transmit data to, receive data from, interact with, and/or control one or more of the propulsion system 166, the sensors 162, the control system 168, and any other components of the vehicle 158. The computing system 160 may be communicatively linked to one or more of the sensors 162, vehicle communications system 164, propulsion system 166, control system 168, power supply 170, and user interface system 172 by a system bus, a network (e.g., via a vehicle-to-vehicle, vehicle-to-infrastructure, vehicle-to-device, and so on), and/or other connection mechanism (not shown).

In at least one embodiment, the computing system 160 may be configured to store data in a local data storage (not shown) and/or communicatively coupled to an external data storage (not shown). It can be appreciated that the data can also be transmitted to a cloud service and received from the cloud service via over-the-air ("OTA") wireless techniques. For instance, OTA wireless technique can be used to transmit updated DNN models or to upload interesting data such as corner cases.

In another embodiment, the computing system 160 may be configured to cause the sensors 162 to capture images of the surrounding environment of the vehicle 158. In yet another embodiment, the computing system 160 may control operation of the propulsion system 168 to autonomously or semi-autonomously operate the vehicle 158. As yet another example, the computing system 160 may be configured to store and execute instructions corresponding to an algorithm (e.g., for steering, braking, and/or throttling) from the control system 170. As still another example, the computing system 160 may be configured to store and execute instructions for determining the environment around the vehicle 158 using the sensors 164. These are just a few examples of the many possible configurations of the computing system 160.

The computing system 160 can include one or more processors (not shown). Furthermore, the computing system can have its own data storage (not shown) and/or use an external data storage. The one or more processors may comprise one or more general-purpose processors and/or one or more special-purpose processors. To the extent the processor includes more than one processor, such processors could work separately or in combination. Data storage of the computing system 160, in turn, may comprise one or more volatile and/or one or more non-volatile storage components, such as optical, magnetic, and/or organic storage. The data storage may be integrated in whole or in part with the one or more processors of the computing system 160 and may be communicatively coupled to the data storage. In some embodiments, data storage of the computing system 160 may contain instructions (e.g., program logic) executable by the processor of the computing system 160 to execute various vehicle functions (e.g., the methods disclosed herein).

The term computing system may refer to data processing hardware, e.g., a CPU and/or GPU, and encompasses all kinds of apparatus, devices, and machines for processing data, including by way of example a programmable processor, a computer, multiple processors, computers, cloud computing, and/or embedded low-power devices (e.g., Nvidia Drive PX2). The system can also be, or further include, special purpose logic circuitry, e.g., an FPGA (field programmable gate array) or an ASIC (application-specific integrated circuit). The system can optionally include, in addition to hardware, code that creates an execution environment for computer programs, e.g., code that constitutes processor firmware, a protocol stack, a database management system, an operating system, or a combination of one or more of them. A computer program can also be used to emulate the computing system.

A computer program which may also be referred to or described as a program, (software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include wired and/or wireless local area networks ("LANs") and wired and/or wireless wide area networks ("WANs"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

The sensors 162 may include a number of sensors (not shown) configured to sense information about an environment in which the vehicle 158 is located, as well as one or more actuators configured to modify a position and/or orientation of the sensors. The sensors can include a global positioning system ("GPS"), an inertial measurement unit ("IMU"), a RADAR unit, a laser rangefinder and/or one or more LIDAR units, and/or a camera. In some embodiments, the sensors 162 may be implemented as multiple sensor units each mounted to the vehicle in a respective position (e.g., top side, bottom side, front side, back side, right side, left side, etc.). Other sensors are possible as well.

The vehicle communications system 164 may be any system communicatively coupled (via wires or wirelessly) to one or more other vehicles, sensors, or other entities, either directly and/or via a communications network. The wireless communication system 164 may include an antenna and a chipset for communicating with the other vehicles, sensors, servers, and/or other entities either directly or via a communications network. The chipset or wireless communication system 164 in general may be arranged to communicate according to one or more types of wireless communication (e.g., protocols) such as BLUETOOTH, communication protocols described in IEEE 802.11 (including any IEEE 802.11 revisions), cellular technology (such as V2X, V2V, GSM, CDMA, UMTS, EV-DO, WiMAX, or LTE), ZIG-BEE, dedicated short range communications (DSRC), and radio frequency identification ("RFID") communications, among other possibilities. The wireless communication system 164 may take other forms as well.

The propulsion system 166 may be configured to provide powered motion for the vehicle 158. The propulsion system 166 may include various components (not shown) to provide such motion, including an engine/motor, an energy source, a transmission, and wheels/tires. The engine/motor may include any combination of an internal combustion engine, an electric motor (that can be powered by a battery, fuel cell and/or other electrical storage device), and/or a steam engine. Other motors and engines are possible as well.

The control system 168 may be configured to control operation of the vehicle 158 and its components. The control system 168 may include various components (now shown), including a steering unit, a throttle, a brake unit, a perception system, a navigation or pathing system, and an obstacle avoidance system.

A perception system may be any system configured to process and analyze images and/or sensor data captured by the sensors (e.g., a camera, RADAR and/or LIDAR) of the vehicle 158 in order to identify objects and/or features in the environment in which the vehicle 158 is located, including, for example, traffic signals and obstacles. To this end, the perception system may use an object recognition algorithm, a Structure from Motion ("SFM") algorithm, video tracking, or other computer vision techniques. In some embodiments, the perception system may additionally be configured to map the environment, track objects, estimate the speed of objects, etc. In at least one embodiment, the overall system can comprise a perception subsystem for identifying objects, a planning subsystem for planning a smooth driving path around the obstacles, and a control subsystem for executing the path from the planner.

The navigation and pathing system may be any system configured to determine a driving path for the vehicle 158. The navigation and pathing system may be configured to update the driving path dynamically while the vehicle 158 is in operation. In some embodiments, the navigation and pathing system may be configured to incorporate data from a sensor fusion algorithm, the GPS, the LIDAR unit, and/or one or more predetermined maps to determine the driving path for vehicle 158.

The power supply 170 may be a source of energy that powers the engine/motor of the vehicle 158 in full or in part and/or powers the electrical equipment of the vehicle 158. The engine/motor of the vehicle may be configured to convert the power supply 170 into mechanical energy. Examples of energy sources for the power supply 170 include gasoline, diesel, propane, other compressed gas-based fuels, ethanol, solar panels, batteries, and other sources of electrical power. The energy source(s) may additionally or alternatively include any combination of fuel tanks, batteries, capacitors, and/or flywheels. In some embodiments, the energy source may provide energy for other systems of the vehicle 158 as well.

The user interface system 172 may include software, a human-machine interface ("HMI"), and/or peripherals (now shown) that are configured to allow the vehicle 158 to interact with external sensors, other vehicles, external computing devices, and/or a user. To this end, the peripherals may include, for example, a wireless communication system, a touchscreen, a microphone, and/or a speaker.

In some embodiments, the vehicle 158 may include one or more elements in addition to or instead of those shown. For example, the vehicle 158 may include one or more additional interfaces and/or power supplies. Other additional components are possible as well. In such embodiments, the data storage of the computing system 160 may further include instructions executable by the processor of the computing system 160 to control and/or communicate with the additional components.

Still further, while each of the components and systems are shown to be integrated in the vehicle 158, in some embodiments, one or more components or systems may be removably mounted on or otherwise connected (mechanically or electrically) to the vehicle 158 using wired or wireless connections. The vehicle 158 may take other forms as well.

In an example embodiment, a cloud service and/or backend server can be configured to perform DNN compression by similarity-based filter pruning. Once the DNN is compressed, the cloud service and/or backend server can deploy the DNN to the vehicle 158 and the vehicle can perform inference using the compressed DNN on embedded hardware of the vehicle 158, e.g., by the computing system 160.

The computing system 160 can run the DNN predictions at runtime on embedded hardware that may have limited computing capabilities. Thus, multiple functions can be run simultaneously on the computing system. The compressed DNN size can lead to a small footprint in memory of the computing system 160 and can be transmitted quickly over wireless connections. Thus, when an improved DNN version is released, the improved DNN can be easily deployed to the vehicle 158 via the vehicle communications system 164 and processed by the computing system 160.

Embodiment 1. A computing system, comprising:
a data storage configured to store a deep neural network ("DNN"); and
at least one processor communicatively coupled to the data storage,
wherein the at least one processor is configured to execute program instructions to cause the system to perform the steps comprising:
training the DNN, wherein the DNN has at least one convolutional layer with a plurality of filters;
clustering the filters of the at least one convolutional layer;
applying dimension reduction on the clustered filters of the at least one convolutional layer;
retraining the DNN to generate a compressed DNN; and
storing the retrained DNN in the data storage.

Embodiment 2. The computing system of Embodiment 1, further comprising the step, after the storing step, of transmitting the retrained DNN to a mobile device.

Embodiment 3. The computing system of Embodiment 2, wherein the mobile device is a vehicle and wherein the retrained DNN is transmitted via an over-the-air wireless broadband network to the vehicle.

Embodiment 4. The computing system of Embodiment 1, further comprising the step, after the applying dimension reduction step, of determining whether a data storage size of the DNN has been compressed to a predefined threshold.

Embodiment 5. The computing system of Embodiment 4 in the determining step, wherein the clustering step and the applying dimension reduction step are iteratively performed based on whether the data storage size of the DNN has been compressed to the predefined threshold.

Embodiment 6. The computing system of Embodiment 1, further comprising a step, after the applying dimension reduction step and before the retraining step, of determining whether the DNN meets a predefined level of accuracy for a predefined data set.

Embodiment 7. The computing system of Embodiment 6 in the determining step, wherein the DNN is retrained until the predefined level of accuracy is met.

Embodiment 8. The computing system of Embodiment 7 in the determining step, wherein if a predefined number of consecutive retrains of the DNN is reached, then iteratively apply the clustering step and the applying dimension reduction step.

Embodiment 9. The computing system of Embodiment 1, after the training step and before the clustering step, comprising the steps of:
calculating similarity measures between the filters of the at least one layer; and removing one or more of the filters based on the calculated similarity measures.

Embodiment 10. A computer-implemented method for compressing at least one layer of a deep neural network (DNN), comprising:
training the DNN by a processor, wherein the at least one convolutional layer has a plurality of filters;
clustering, by the processor, the filters of the at least one layer; applying dimension reduction, by the processor, on the clustered filters of the at least one layer;
retraining, by the processor, the DNN; and
storing the retrained DNN in a storage device.

Embodiment 11. The computer-implemented method of Embodiment 10, further comprising the step, after the storing step, of transmitting the compressed DNN to a mobile device.

Embodiment 12. The computer-implemented method of Embodiment 11, wherein the mobile device is a vehicle and wherein the compressed DNN is transmitted via an over-the-air wireless broadband network to the vehicle.

Embodiment 13. The computer-implemented method of Embodiment 10, further comprising the step, after the applying dimension reduction step, of determining whether a data storage size of the DNN has been compressed to apredefined threshold.

Embodiment 14. The computer-implemented method of Embodiment 13 in the determining step, wherein the clustering step and the applying dimension reduction step are iteratively performed based on whether the data storage size of the DNN has been compressed to the predefined threshold.

Embodiment 15. The computer-implemented method of Embodiment 10, further comprising a step, after the applying dimension reduction step and before the retraining step, of determining whether the DNN meets a predefined level of accuracy for a predefined data set.

Embodiment 16. The computer-implemented method of Embodiment 15 in the determining step, wherein the DNN is retrained until the predefined level of accuracy is met.

Embodiment 17. The computer-implemented method of Embodiment 16 in the determining step, wherein if a predefined number of consecutive retrains of the DNN is reached, then iteratively apply the clustering step and the applying dimension reduction step.

Embodiment 18. The computer-implemented method of Embodiment 10, after the training step and before the clustering step, comprising the steps of:
 calculating similarity measures between the filters of the at least one layer; and
 removing one or more of the filters based on the calculated similarity measures.

Embodiment 19. A non-transitory computer readable medium encoded with instructions that when executed by at least one processor causes the processor to carry out the following operations:
 training a convolutional neural network ("CNN"), wherein the CNN has at least one layer of filters;
 calculating similarity measures between the filters of the at least one layer;
 removing one or more of the filters based on the calculated similarity measures;
 clustering remaining ones of the filters of the at least one layer;
 applying dimension reduction on the clustered filters of the at least one layer;
 determining whether a data storage size of the DNN has been compressed to a predefined threshold, wherein the clustering step and the applying dimension reduction step are iteratively performed based on whether the data storage size of the DNN has been compressed to the predefined threshold;
 determining whether the DNN meets a predefined level of accuracy for a predefined data set; and
 retraining the CNN a predefined number of times until the predefined level accuracy is met.

Embodiment 20. The computer-implemented method of Embodiment 19 further comprising the operation, after the retraining the CNN operation, of, transmitting the retrained DNN to a vehicle via an over-the-air wireless broadband network.

While the functionality of the disclosed embodiments and the system components used to provide that functionality have been discussed with reference to specific terminology that denotes the function to be provided, it should be understand that, in implementation, the component functionality may be provided, at least in part, components present and known to be included in conventional transportation vehicles.

For example, as discussed above, disclosed embodiments use software for performing functionality to enable measurement and analysis of data, at least in part, using software code stored on one or more non-transitory computer readable mediums running on one or more processors in a transportation vehicle. Such software and processors may be combined to constitute at least one controller coupled to other components of the transportation vehicle to support and provide autonomous and/or assistive transportation vehicle functionality in conjunction with vehicle navigation systems, and multiple sensors. Such components may be coupled with the at least one controller for communication and control via a CAN bus of the transportation vehicle or other busses (e.g., Flexray).

It should further be understood that the presently disclosed embodiments may be implemented using dedicated or shared hardware included in a transportation vehicle. Therefore, components of the module may be used by other components of a transportation vehicle to provide vehicle functionality without departing from the scope of the present disclosure.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

Disclosed embodiments include the methods described herein and their equivalents, non-transitory computer readable media programmed to carry out the methods and a computing system configured to carry out the methods. Further, included is a vehicle comprising components that include any of the methods, non-transitory computer readable media programmed to implement the instructions or carry out the methods, and systems to carry out the methods. The computing system, and any sub-computing systems, will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure.

It can be appreciated that embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

I claim:

1. A computing system, comprising:
a data storage configured to store a deep neural network ("DNN"); and
at least one processor communicatively coupled to the data storage,
wherein the at least one processor is configured to execute program instructions to cause the system to perform the steps comprising:
training the DNN, wherein the DNN has at least one convolutional layer with a plurality of filters;
calculating similarity measures between the filters of the at least one layer;
removing one or more of the filters based on the calculated similarity measures;
clustering remaining ones of the filters of the at least one convolutional layer;
applying dimension reduction on the clustered filters of the at least one convolutional layer;
retraining the DNN to generate a compressed DNN; and storing the retrained DNN in the data storage.

2. The computing system of claim 1 further comprising the step, after the storing step, of transmitting the retrained DNN to a mobile device.

3. The computing system of claim 2 wherein the mobile device is a vehicle and wherein the retrained DNN is transmitted via an over-the-air wireless broadband network to the vehicle.

4. The computing system of claim 1 further comprising the step, after the applying dimension reduction step, of determining whether a data storage size of the DNN has been compressed to a predefined threshold.

5. The computing system of claim 4 in the determining step, wherein the clustering step and the applying dimension reduction step are iteratively performed based on whether the data storage size of the DNN has been compressed to the predefined threshold.

6. The computing system of claim 1 further comprising a step, after the applying dimension reduction step and before the retraining step, of determining whether the DNN meets a predefined level of accuracy for a predefined data set.

7. The computing system of claim 6 in the determining step, wherein the DNN is retrained until the predefined level of accuracy is met.

8. The computing system of claim 7 in the determining step, wherein if a predefined number of consecutive retrains of the DNN is reached, then iteratively apply the clustering step and the applying dimension reduction step.

9. The computing system of claim 1, wherein the steps of calculating similarity measure and removing one or more of the filters are performed after the training step and before the clustering step.

10. A computer-implemented method for compressing at least one layer of a deep neural network (DNN), comprising:
training the DNN by a processor, wherein the at least one convolutional layer has a plurality of filters;
calculating similarity measures between the filters of the at least one layer;
removing one or more of the filters based on the calculated similarity measures;
clustering, by the processor, remaining ones of the filters of the at least one layer;
applying dimension reduction, by the processor, on the clustered filters of the at least one layer;
retraining, by the processor, the DNN; and
storing the retrained DNN in a storage device.

11. The computer-implemented method of claim 10 further comprising the step, after the storing step, of transmitting the compressed DNN to a mobile device.

12. The computer-implemented method of claim 11 wherein the mobile device is a vehicle and wherein the compressed DNN is transmitted via an over-the-air wireless broadband network to the vehicle.

13. The computer-implemented method of claim 10 further comprising the step, after the applying dimension reduction step, of determining whether a data storage size of the DNN has been compressed to apredefined threshold.

14. The computer-implemented method of claim 13 in the determining step, wherein the clustering step and the applying dimension reduction step are iteratively performed based on whether the data storage size of the DNN has been compressed to the predefined threshold.

15. The computer-implemented method of claim 10 further comprising a step, after the applying dimension reduction step and before the retraining step, of determining whether the DNN meets a predefined level of accuracy for a predefined data set.

16. The computer-implemented method of claim 15 in the determining step, wherein the DNN is retrained until the predefined level of accuracy is met.

17. The computer-implemented method of claim 16 in the determining step, wherein if a predefined number of consecutive retrains of the DNN is reached, then iteratively apply the clustering step and the applying dimension reduction step.

18. The computer-implemented method of claim 10, wherein the steps of calculating similarity measure and removing one or more of the filters are performed after the training step and before the clustering step.

19. A non-transitory computer readable medium encoded with instructions that when executed by at least one processor causes the processor to carry out the following operations:

training a convolutional neural network ("CNN"), wherein the CNN has at least one layer of filters;

calculating similarity measures between the filters of the at least one layer;

removing one or more of the filters based on the calculated similarity measures;

clustering remaining ones of the filters of the at least one layer;

applying dimension reduction on the clustered filters of the at least one layer;

determining whether a data storage size of the DNN has been compressed to a predefined threshold, wherein the clustering step and the applying dimension reduction step are iteratively performed based on whether the data storage size of the DNN has been compressed to the predefined threshold;

determining whether the DNN meets a predefined level of accuracy for a predefined data set; and retraining the CNN a predefined number of times until the predefined level accuracy is met.

20. The non-transitory computer readable medium of claim 19 further comprising the operation, after the retraining the CNN operation, of, transmitting the retrained DNN to a vehicle via an over-the-air wireless broadband network.

* * * * *